(12) United States Patent
Chen et al.

(10) Patent No.: US 7,440,646 B2
(45) Date of Patent: Oct. 21, 2008

(54) ARRAY OPTICAL SUBASSEMBLY FOR ARRAY OPTICAL ACTIVE COMPONENT

(75) Inventors: Yi-Ming Chen, Chupei (TW);
Chiung-Hung Wang, Pateh (TW);
Shun-Tien Lee, Hsinchuang (TW);
Yao-Ling Cheng, Taipei (TW);
Cherng-Shiun Wu, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 54 days.

(21) Appl. No.: 10/826,176

(22) Filed: Apr. 15, 2004

(65) Prior Publication Data

US 2005/0135726 A1 Jun. 23, 2005

(51) Int. Cl.
*G02B 6/12* (2006.01)
*G02B 6/26* (2006.01)

(52) U.S. Cl. .............................. 385/14; 385/52; 385/15

(58) Field of Classification Search ................... 385/14, 385/15, 52
See application file for complete search history.

(56) References Cited

U.S. PATENT DOCUMENTS

| 6,510,262 | B2 | 1/2003 | Gallup et al. | |
| 6,547,454 | B2 | 4/2003 | Wickman et al. | |
| 6,636,653 | B2 * | 10/2003 | Miracky et al. | ................ 385/14 |
| 6,690,845 | B1 * | 2/2004 | Yoshimura et al. | ............ 385/14 |
| 2002/0105699 | A1 * | 8/2002 | Miracky et al. | ............. 359/159 |
| 2003/0201462 | A1 * | 10/2003 | Pommer et al. | ............. 257/200 |
| 2004/0022487 | A1 * | 2/2004 | Nagasaka et al. | ............. 385/31 |

FOREIGN PATENT DOCUMENTS

JP  2003-503858  1/2003

* cited by examiner

*Primary Examiner*—K. Cyrus Kianni
(74) *Attorney, Agent, or Firm*—Jianq Chyun IP Office

(57) ABSTRACT

An array optical subassembly has a substrate, at least one optical active component, a driver IC, a circuit board and a cover covering the foregoing elements. The substrate has two opposite surfaces, wherein one surface is formed by a lens array and the other surface is formed by metal pads, lines and alignment keys. The optical active component has a source array aligned to the lens array when the optical active component is connected to the metal pads on the substrate. The driver IC and the circuit board are also connected to the metal pads on the substrate to drive the optical active component. The lens array is directly formed on the substrate so the source array is aligned to the lens array very well by the alignment keys when the optical active component connected to the substrate.

22 Claims, 6 Drawing Sheets

ARRAY OPTICAL SUBASSEMBLY FOR ARRAY OPTICAL ACTIVE COMPONENT

BACKGROUND OF THE INVENTION

1. Field of the Invention

The present invention relates to an optical fiber device, and more specifically to an array optical subassembly for an array optical active component that has good alignment between the optical active component and the optical fiber cable.

2. Description of Related Art

To establish an optical fiber communication system requires many and complex optical devices and fiber cables. In addition, a coupling technique for the optical devices and the fiber cables is very important to keep the light signal steady in the communication system.

According to U.S. Pat. No. 6,510,262, ('262) a Z-axis alignment of the fiber, lens and source arrays has been proposed to improve coupling quality among the fiber, lines and source arrays. With reference to FIG. 7 (FIG. 2 in the '262 patent wherein the only difference is in the numerals), the alignment includes a separation-setting member (83), a lens array (81), a chip (82) mounted on a metallic member (84), guide pins (85), a connector (87) with fiber cable (80), and a receptacle (86).

To increase accuracy of alignment between the chip (82) and the lens array (81), the lens array (81) is first mounted on the separation-setting member (83) and then the guide pins (85) are connected through the metallic member (84), the guide pins (85), the receptacle (86) and the connector (87). Therefore, the metallic member (84), the guide pins (85), receptacle (86) and the connector (87) are combined together by use of the guide pins (85), but alignment process of the chip (82), the lens array (81) and the fiber cable (80) is complex. One active alignment process is required in mounting the lens array (81) on the separation-setting member (83). In addition, the lens array (81) may become undesirably heated while the lens array (81) is being adhered on the separation-setting member (83). As the lens array (81) is generally made of plastic, such heating may negatively effect the curvature thereof, and thus the stability of light signals transmitted will be impaired. Thus, satisfactory micro-level of alignment in the '262 patent is not achievable.

Further, U.S. Pat. No. 6,547,454, ('454), discloses another coupling device for optical active components and the lens array. With reference to FIG. 8 (FIG. 4 in the '454 patent and wherein the only difference is in the numerals), the optical active component (8) and the lens array (8') are formed as multiple alignment keys (not numbered) by a semiconductor fabricating process. The alignment keys include multiple fine grains (7) and grooves (9). For example, the multiple grains (7) are formed on a surface of the optical active component (8) and the fine grooves (9) are formed on a surface of the lens array (8') corresponding to the fine grains (7). When the optical active component (8) and the lens array (8') are assembled together, the alignment keys increase the accuracy of the alignment between the optical active components and lens array. The '454 patent uses the alignment keys in the semiconductor fabricating process so the alignment between the lens array and optical active components can be successfully achieved at micro-level. However, the lens array and the optical active components must be processed by the semiconductor fabricating process to form the micro-level alignment keys and thus the '454 patent requires a complex fabricating process.

The present invention provides an array optical subassembly having a high accuracy of alignment and a simple assembly process.

SUMMARY OF THE INVENTION

An objective of the present invention is to provide an array optical subassembly that has micro-level alignment and a simple assembly process to increase assembly efficiency.

Another objective of the present invention is to provide an array optical subassembly which is suitable for assembling to an array optical assembly according to the SNAP 12 standard.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
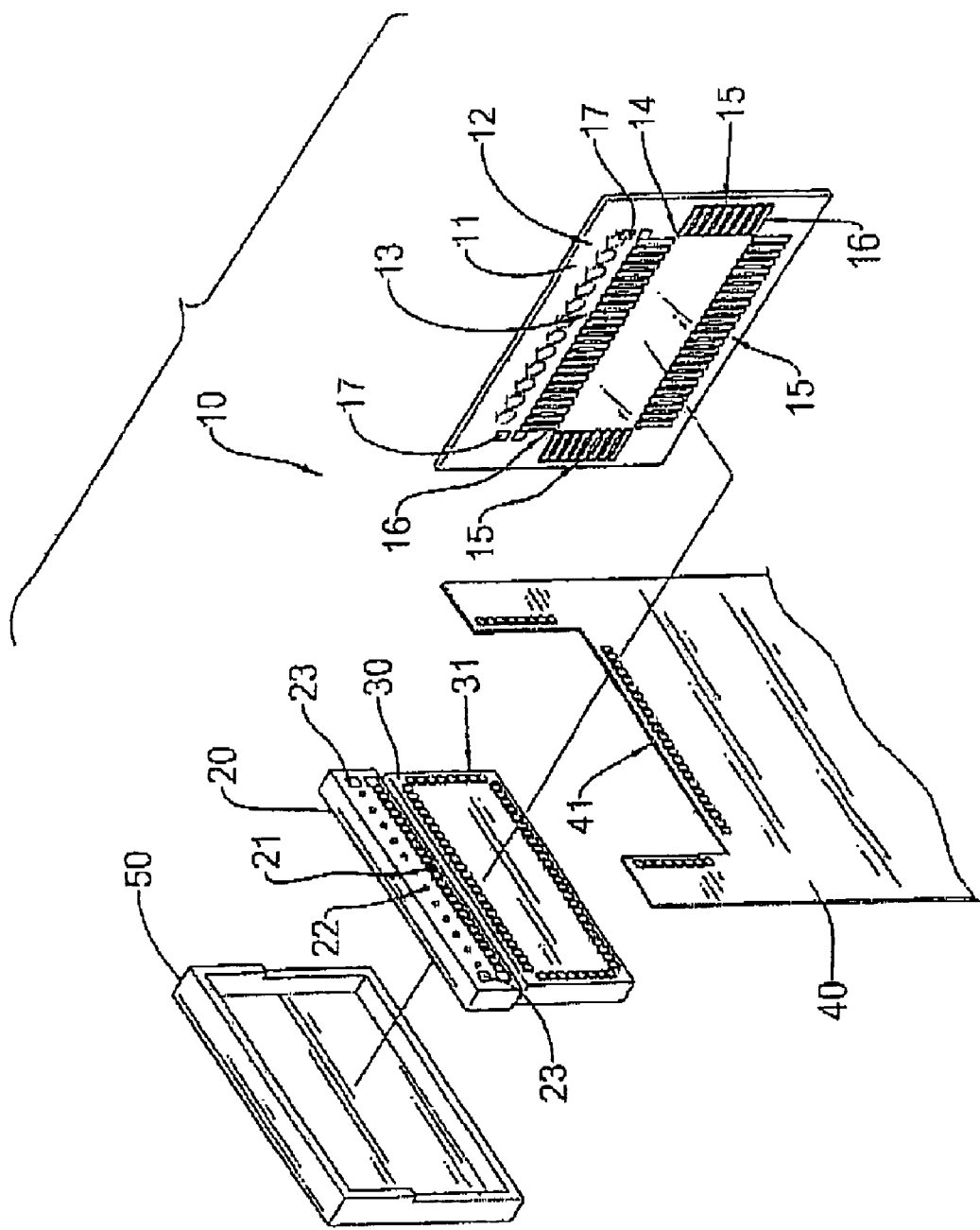
FIG. 1 is a perspective exploded view of a first embodiment of an array optical subassembly in accordance with the present invention.

With reference to FIG. 1, a first embodiment of the array optical assembly (10) includes a substrate (11) with a lens array (12), at least one optical active component (20), a driver IC (30), a circuit board (40) and a cover (50). The substrate (11) is connected to the circuit board (40), the optical active component (20) and drive IC (30).

The substrate (11) has two opposites surfaces (not numbered), one surface is formed as the lens array (12) and the other surface is formed as multiple first, second, and third metal pads (13,14,15), metal lines (16) and multiple alignment keys (17). The second metal pads (14) are respectively connected to the first and third metal pads (13,15) through the metal lines (16). In the first embodiment, all the area of the substrate is made of a glass material or other transparent material. Besides, a specific area of the substrate where the lens array is formed is made of the transparent material. The alignment keys (17) are made of a metal material and are shaped to a rectangular, cruciform, triangular, or other geometric figures.

The optical active component (20) has first multiple terminals (21) corresponding to the first metal pads (13) on the substrate (11), a source array (22) corresponding to the lens array (12) and multiple alignment keys (23) corresponding to the alignment keys (17) on the substrate (11). Optical axes of the source array (22) and lens array (12) are parallel. The source array (22) is composed of multiple lasers or light detectors.

The driver IC (30) has multiple second terminals (31) corresponding to the second metal pads (14) on the substrate (11). The drive IC (30) is used to drive the optical active component (20) because the second metal pads (14) are connected to the first metal pads (13).

The circuit board (40) has multiple third terminals (41) corresponding to the third metal pads (15) on the substrate (11). The circuit board (40) controls the driver IC 30 because the third metal pads (16) are connected to the second metal pads (14).

The cover (50), which is a semi-airtight type or airtight type, covers the substrate (11), the optical active component (20), driver IC (30) and circuit board (40).

Figure 3:
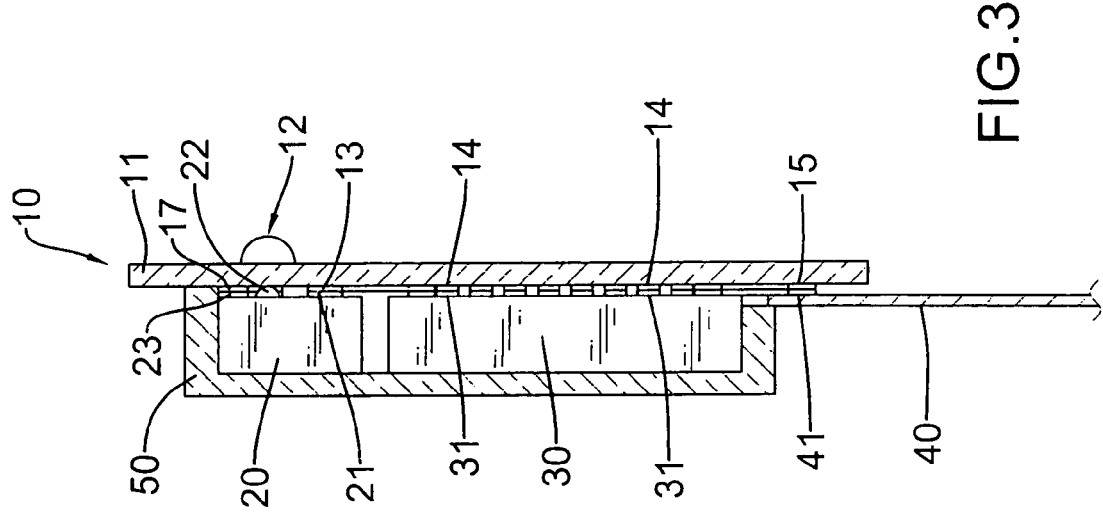
FIG. 3 is a cross sectional plan view along 2-2 line in FIG. 2.
Figure 2:
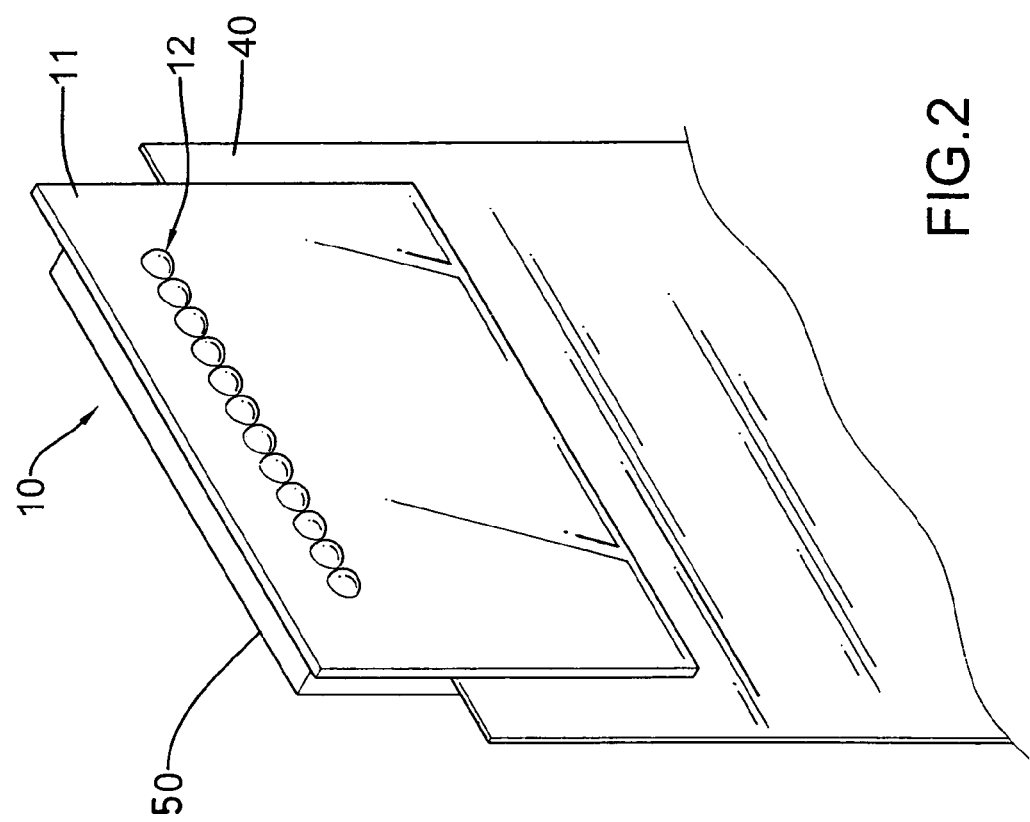
FIG. 2 is a perspective view of FIG. 1.

With reference to FIGS. 2 and 3, to assemble the array optical subassembly (10) the optical active component (20), the driver IC (30) and the circuit board (40) are respectively connected to the first, second and third metal pads (13,14,15) on the substrate (11) and then the cover (50) covers these elements. Because the optical active component (20) and the substrate (11) respectively have the alignment keys (23,17), the accuracy of the alignment between the source array (22) and the lens array (12) can be increased. In addition, the optical active component (20) is easily aligned to the substrate (11) by the present semiconductor equipment. Therefore, the alignment can easily and satisfactorily reach micro-level.

Figure 4:
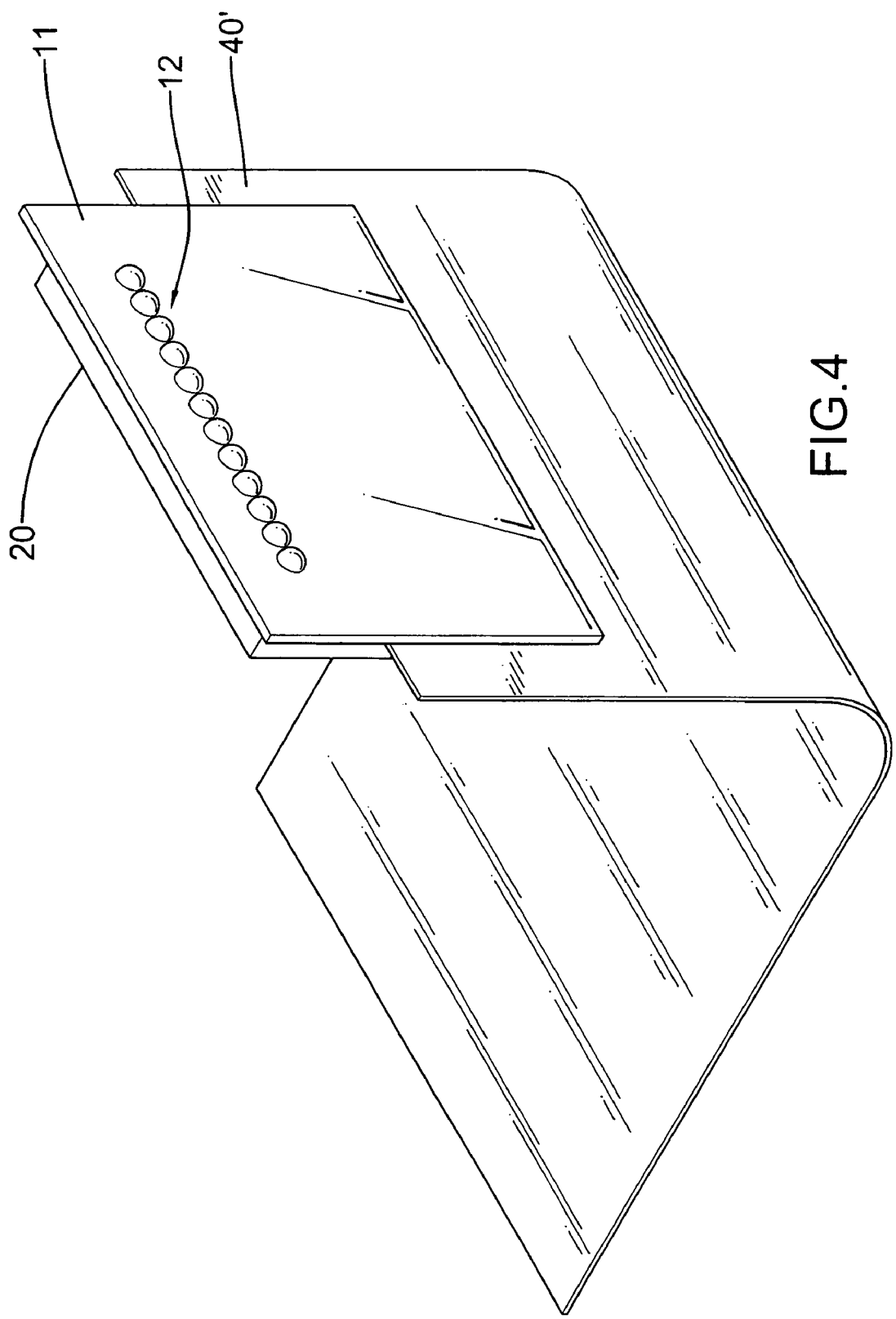
FIG. 4 is a perspective view of a second embodiment of an array optical subassembly in accordance with the present invention.

The circuit board (40) can be a flexible circuit board so the circuit board (40) is able to be bent to a specific shape. For example, FIG. 4 shows an L-shaped circuit board (40').

Figure 5:
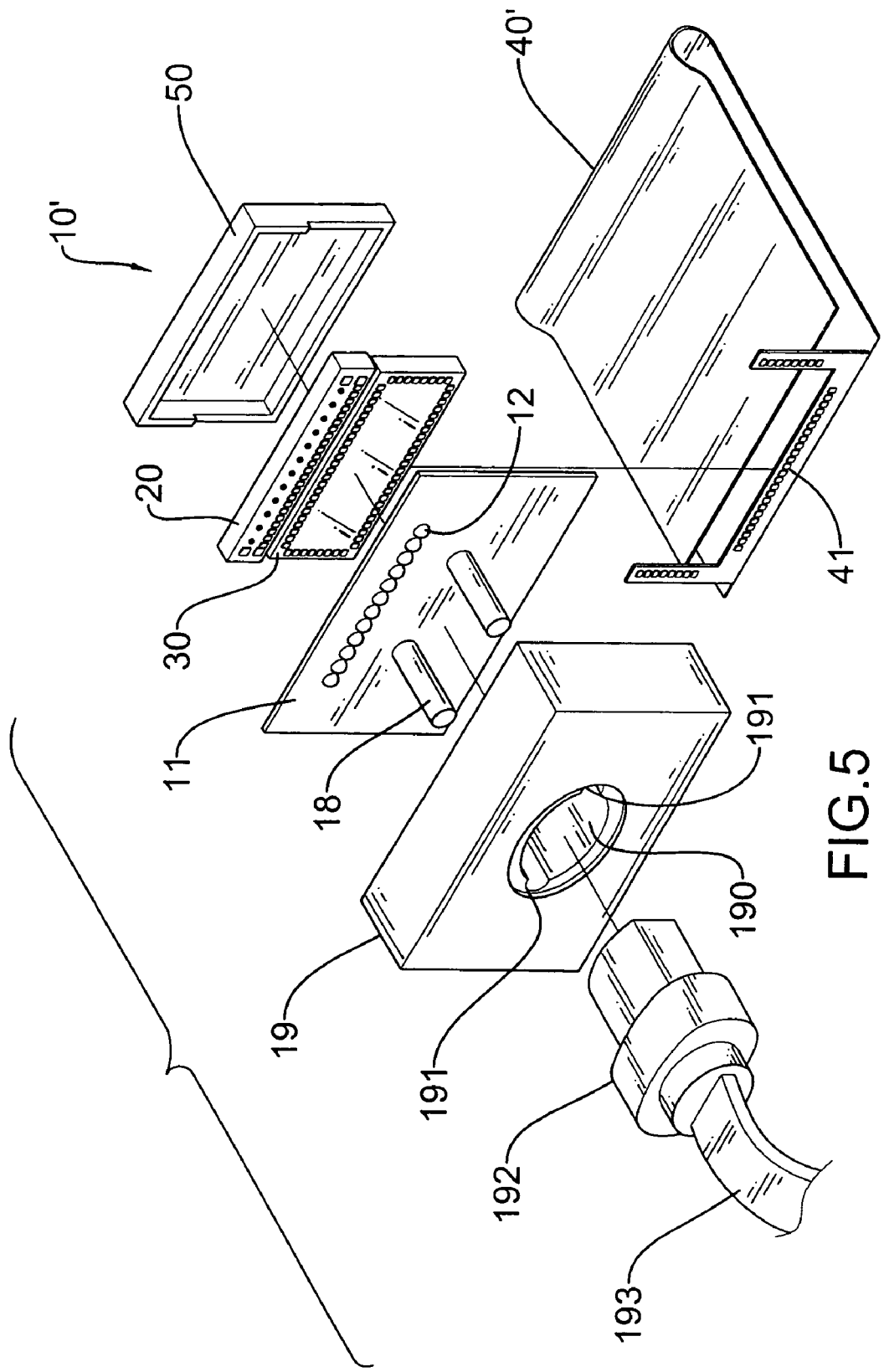
FIG. 5 is a perspective exploded view of a third embodiment of an array optical subassembly in accordance with the present invention.

With reference to FIG. 5, a second embodiment of the array optical subassembly (10') includes all elements of the first embodiment and further includes a connecting set (19), a fiber connector (192) and two opposite guide rods (18) respectively formed on the lens array surface of the substrate (11). The connecting set (19) has one recess (190) and two opposite holes (191) corresponding to the two opposite guide rods (18) on the substrate (11). The fiber connector (192) has an optical fiber array (193) corresponding to the lens array (12). The two opposite connecting rods (18) on the substrate (11) are respectively inserted to the holes (191) of the connecting set (19) and the lens array (12) faces to the recess of the connecting set (19). The fiber connector (192) is retained in the recess (190) of the connecting set (19). Therefore, the connecting set (19) is connected with the substrate (11) and the fiber connector (192) and the optical fiber array (193) are aligned to the lens array (12) on the substrate (11), wherein optical axes (not numbered) of the optical fibers array (193) and the lens array (12) are parallel.

Figure 6:
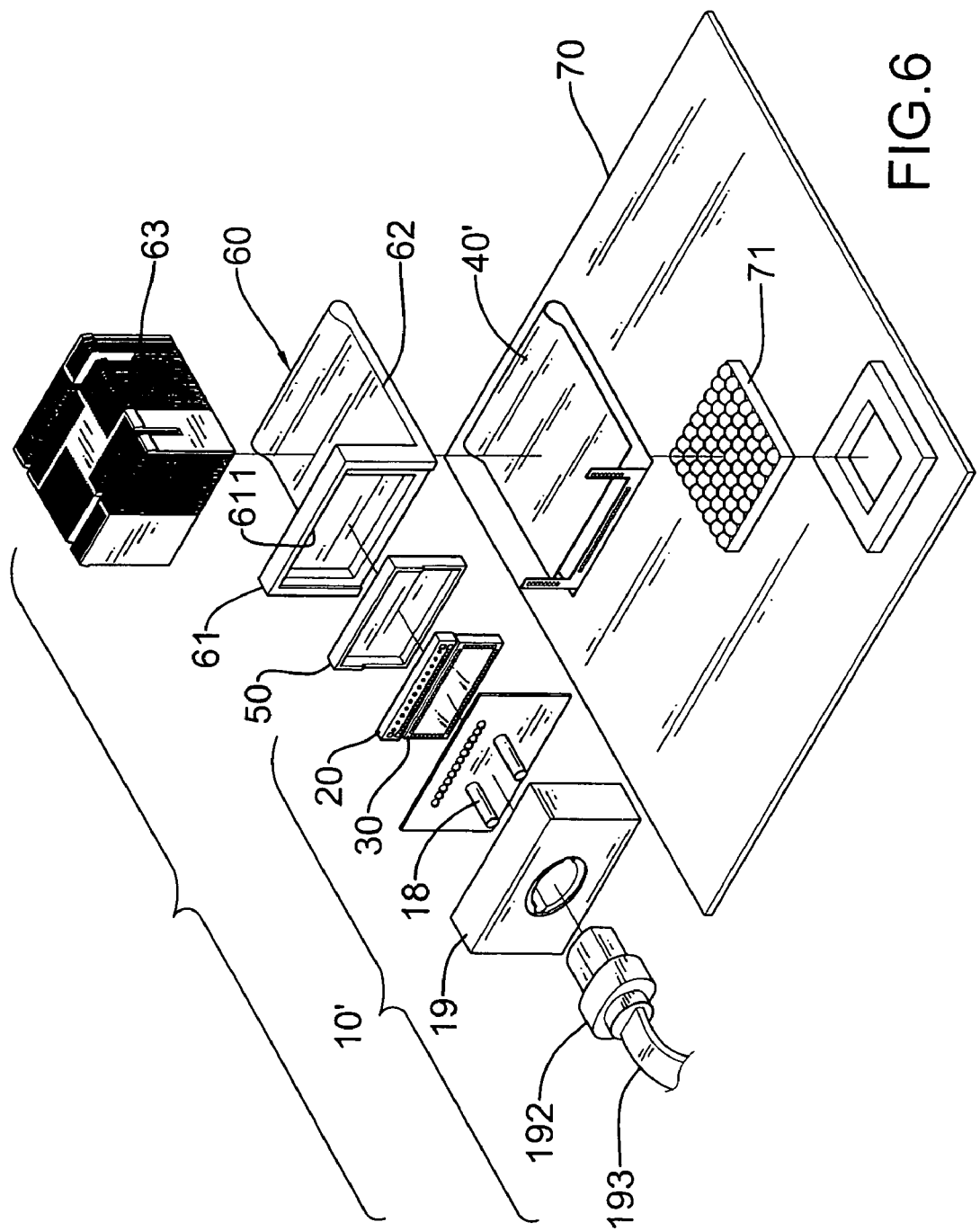
FIG. 6 is a perspective exploded view of an array optical assembly with the array optical assembly as shown in FIG. 5.
Figure 7:
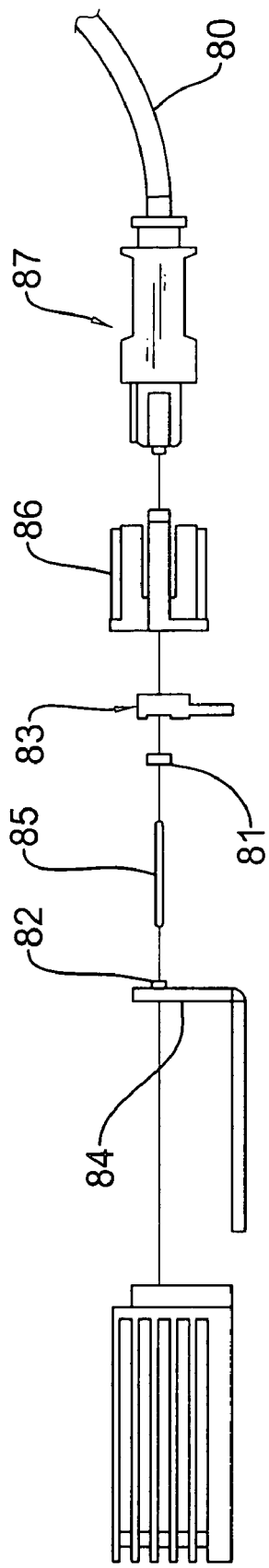
FIG. 7 is an exploded view of a prior art optical array sub assembly.
Figure 8:
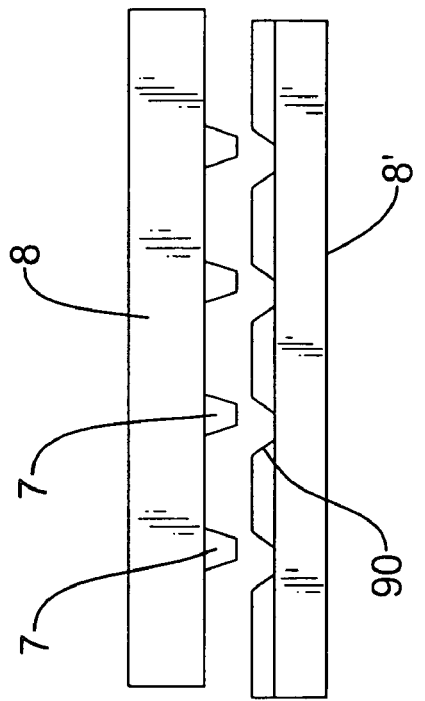
FIG. 8 is a side view of another prior art optical array sub assembly.

With reference to FIG. 6, according to the SNAP 12 standard, a 12-channel array optical assembly (not numbered) with the second embodiment of the array optical subassembly (10') is disclosed. The array optical assembly further includes a base (60), a heat sink (63) and a main circuit board (70) with a chip (71).

The base (60) is formed L-shaped corresponding to the L-shaped circuit board (40') so the base (60) has a vertical portion (61) and a horizontal portion (62). The vertical portion (61) has a through hole (611) where the cover (50) of the array optical subassembly (10') is retained. The heat sink (63) is mounted on the horizontal portion (62). The circuit board (40') is connected between the base (60) and the main circuit board (70) and the circuit board (40') is further electronically connected to the chip (71) on the main circuit board (70).

Based on the foregoing description, the present invention compares with the '262 patent, and the substrate of the present invention has a function of the separation-setting member of the '262 patent. The substrate is integrated with the lens array thereon so the present invention saves one active alignment process when the lens array is assembled with the separation-setting member. Therefore, the present invention has better accuracy of alignment than the '262 patent. Further, the present invention uses the alignment keys to achieve alignment between the optical active component and the lens array at the micro-level. The optical active component is connected to the substrate by the present semiconductor equipment so the optical active component and the substrate do not require the formation of micro-level alignment keys. Therefore, the present invention has a simpler process and lower cost.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An array optical subassembly for an array optical active component, comprising:
    a substrate having two opposite surfaces, wherein a lens array is formed on one surface and multiple metal pads, multiple metal lines and alignment keys are formed on the other surface;
    at least one optical active component deposed on the substrate, wherein the at least one optical active component has a multiple source array corresponding to the lens array of the substrate, multiple first terminals corresponding to the metal pads, and alignment keys corresponding to the alignment keys of the substrate, wherein the alignment keys of the substrate are aligned to the alignment keys of the at least one optical active component for disposing the least one optical active component on the substrate;
    a connecting set having a plurality of holes;
    a plurality guide rods being formed on the surface of the substrate having the lens array, to be inserted into the holes;
    a driver IC connected on the substrate, wherein the driver IC has multiple second terminals corresponding to the metal pads;
    a circuit board connected on the substrate, wherein the circuit board has multiple third terminals corresponding to the metal pads; and
    a cover covering the substrate, the at least one optical active component, the driver IC and the circuit board.

2. The array optical subassembly as claimed in claim 1, wherein a specific area of the substrate is made of transparent material and the metal pads include first metal pads, second metal pads and third metal pads; wherein
    the first metal pads are respectively connected to the first terminals;
    the second metal pads are respectively connected to the second terminals; and
    the third metal pads are respectively connected to the third terminals.

3. The array optical subassembly as claimed in claim 1, wherein the source array of the at least one optical active component is composed of lasers.

4. The array optical subassembly as claimed in claim 1, wherein the source array of the at least one optical active component is composed of light detectors.

5. The array optical subassembly as claimed in claim 1, wherein the circuit board is flexible.

6. The array optical subassembly as claimed in claim 1, wherein the cover is a semi-airtight type or airtight type.

7. The array optical subassembly as claimed in claim 1, wherein each source array and each lens array respectively has one optical axis and the optical axes of the source array and lens array are parallel.

8. The array optical subassembly as claimed in claim 1, wherein the connecting set having two opposite holes and the surface of the substrate having lens array further forms with two opposite guide rods, wherein the two opposite rods are respectively inserted to the two opposite holes.

9. The array optical subassembly as claimed in claim 1, wherein the connecting set further defines one recess for retaining a fiber connector with an optical fiber array, wherein the optical fiber array has one optical axis which is parallel with the optical axis of each lens array.

10. The array optical subassembly as claimed in claim 1, wherein the alignment keys of the substrate are aligned to the alignment keys of the at least one optical active component with direct contact.

11. An array optical assembly comprising:
an array optical subassembly unit having:
a substrate having two opposite surfaces, wherein a lens array is formed on one surface and multiple metal pads, multiple metal lines and alignment keys are formed on the other surface;
at least one optical active component assembled on the substrate, wherein the at least one optical active component has a multiple source array corresponding to the lens array of the substrate, multiple first terminals corresponding to the metal pads, and alignment keys corresponding to the alignment keys of the substrate, wherein the alignment keys of the substrate are aligned to the alignment keys of the at least one optical active component for assembling the least one optical active component on the substrate;
a connecting set having a plurality of holes;
a plurality of guide rods formed on the surface of the substrate having the lens array, to be inserted into the holes;
a driver IC connected on the substrate, wherein the driver IC has multiple second terminals corresponding to the metal pads;
a circuit board connected on the substrate, wherein the circuit board has multiple third terminals corresponding to the metal pads; and
a cover covering the substrate, the at least one optical active component the driver IC and the circuit board; and
a base connected between the cover of the array optical assembly and the circuit board; and a main circuit board electronically connected to the circuit board.

12. The array optical assembly as claimed in claim 11, wherein the base is L-shaped and has a vertical portion and a horizontal portion; wherein the vertical portion is defined with a through hole wherein the cover is retained in the through hole.

13. The array optical assembly as claimed in claim 12, further comprising a heat sink, which is mounted on the horizontal portion of the base.

14. The array optical assembly as claimed in claim 11, wherein a specific area of the substrate is made of transparent material and the metal pads include first metal pads, second metal pads and third metal pads; wherein
the first metal pads are respectively connected to the first terminals;
the second metal pads are respectively connected to the second terminals; and
the third metal pads are respectively connected to the third terminals.

15. The array optical assembly as claimed in claim 11, wherein the source array of the at least one optical active component is composed of multiple lasers.

16. The array optical assembly as claimed in claim 11, wherein the source array of the at least one optical active component is composed of light detectors.

17. The array optical assembly as claimed in claim 11, wherein the circuit board is flexible.

18. The array optical assembly as claimed in claim 11, wherein the cover is a semi-airtight type or airtight type.

19. The array optical assembly as claimed in claim 11, wherein each source array and each lens array respectively has one optical axis and the optical axes of the source array and lens array are parallel.

20. The array optical assembly as claimed in claim 11, wherein the connecting set having two opposite holes and the surface of the substrate having the lens array further forms with two opposite guide rods, wherein the two opposite rods are respectively inserted to the two opposite holes.

21. The array optical assembly as claimed in claim 11, wherein the connecting set is further defined with one recess for retaining a fiber connector with an optical fiber array, wherein the optical fiber array has one optical axis which is parallel with the optical axis of each lens array.

22. The array optical assembly as claimed in claim 11, wherein the alignment keys of the substrate are aligned to the alignment keys of the at least one optical active component with direct contact.

* * * * *